(12) United States Patent
Lu

(10) Patent No.: US 8,467,540 B2
(45) Date of Patent: Jun. 18, 2013

(54) ELECTRONIC DEVICE AND METHOD THEREOF FOR SWITCHING AUDIO INPUT CHANNEL OF THE ELECTRONIC DEVICE

(75) Inventor: Yen-Kuang Lu, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 379 days.

(21) Appl. No.: 12/826,677

(22) Filed: Jun. 30, 2010

(65) Prior Publication Data

US 2011/0188669 A1 Aug. 4, 2011

(30) Foreign Application Priority Data

Feb. 3, 2010 (CN) .......................... 2010 1 0301150

(51) Int. Cl.
*H04R 1/10* (2006.01)
(52) U.S. Cl.
USPC ........................................................... 381/74
(58) Field of Classification Search
USPC ............... 381/74, 81, 123, 111, 113, 309, 87; 455/556.1, 575.2, 557, 550.1
See application file for complete search history.

(56) References Cited

U.S. PATENT DOCUMENTS

| | | | | |
|---|---|---|---|---|
| 7,836,216 B2 * | 11/2010 | Kashi et al. | ..................... | 710/15 |
| 7,869,608 B2 * | 1/2011 | Sander et al. | ................. | 381/113 |
| 7,912,501 B2 * | 3/2011 | Johnson et al. | ............ | 455/556.1 |
| 8,155,337 B2 * | 4/2012 | Choi et al. | ........................ | 381/74 |
| 8,180,397 B2 * | 5/2012 | Stenmark et al. | ............. | 455/557 |
| 2005/0201568 A1 * | 9/2005 | Goyal | ............................. | 381/74 |
| 2009/0296952 A1 * | 12/2009 | Pantfoerder et al. | ............ | 381/74 |

FOREIGN PATENT DOCUMENTS

| | | |
|---|---|---|
| CN | 101198192 A | 6/2008 |
| CN | 201349247 Y | 11/2009 |

\* cited by examiner

*Primary Examiner* — Xu Mei
*Assistant Examiner* — David Ton
(74) *Attorney, Agent, or Firm* — Altis Law Group, Inc.

(57) ABSTRACT

The present disclosure provides an electronic device and a method for switching an audio input channel of the electronic device. The electronic device includes a headphone interface, a detection circuit, a signal processing unit, and a multiplexer. The headphone interface is operable to connect with an audio connector of a headphone. The detection circuit includes a headphone pin and a button pin. The detection circuit detects a level of a last pole of the audio connector, transfers the level of the last pole into a first level of the headphone pin and a second level of the button pin, and outputs the first level and the second level to the signal processing unit. The signal processing unit transmits commands to the multiplexer in response to the first level and the second level. The multiplexer switches the audio input channel of the electronic device based on the commands.

12 Claims, 4 Drawing Sheets

ELECTRONIC DEVICE AND METHOD THEREOF FOR SWITCHING AUDIO INPUT CHANNEL OF THE ELECTRONIC DEVICE

BACKGROUND

1. Technical Field

The present disclosure relates to an electronic device and a method thereof for switching an audio input channel of the electronic device.

2. Description of Related Art

Electronic devices such as mobile phones, personal digital assistants (PDAs), digital still cameras (DSCs), and others, supporting audio input and output, are widely used. Currently, two types of headphones are suitable for the electronic device. One type of headphone has no microphone and only supports audio output. The other type of headphone combines with the microphone, so-called headset, and supports both the audio input and output. However, the audio input and output of the electronic device are still assigned to the headphone having no microphone when the headphone having no microphone is inserted into the electronic device. The audio input is unacceptably disable.

Accordingly, an improved electronic device and method are called for in order to overcome the limitations described.

DETAILED DESCRIPTION

In general, the words "unit" and "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
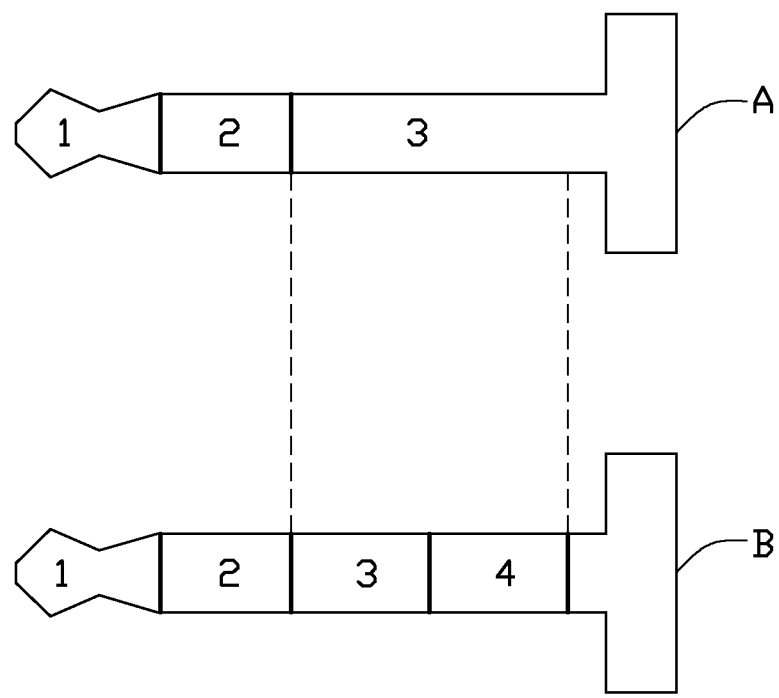
FIG. 1 shows an exemplary embodiment of audio connectors of two types of headphones.

FIG. 1 shows an exemplary embodiment of two types of audio connectors of a headphone. The audio connectors are operable to connect with electronic devices. The audio connector of the headphone having no microphone is an audio jack A. A first pole of the audio jack A is operable to transmit a left channel of an audio signal. A second pole of the audio jack A is operable to transmit a right channel of the audio signal. A third pole of the audio jack A is operable to connect to ground.

The audio connector of a headset, comprising a headphone with a microphone and a control button, is an audio jack B. The first pole of the audio jack B is operable to transmit the left channel of the audio signal. The second pole of the audio jack B is operable to transmit the right channel of the audio signal. The third pole of the audio jack B is operable to connect to ground. A fourth pole of the audio jack B is operable to transmit an audio input signal of the microphone and a button signal of the control button. The sum of the lengths of the third and fourth poles of the audio jack B is equal to the length of the third pole of the audio jack A. When the control button is pressed, the fourth pole of the audio jack B is also operable to connect to ground and the control button can control a plurality of functions of the electronic device.

Figure 2:
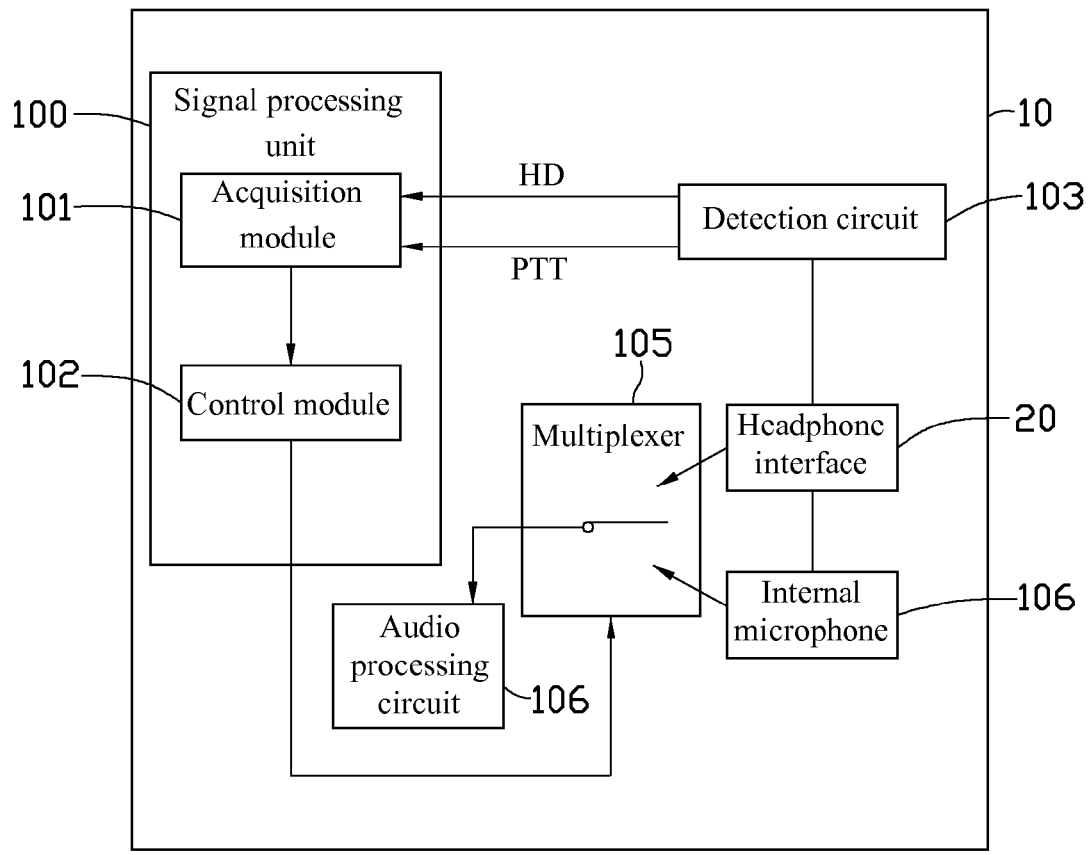
FIG. 2 is a block diagram of one embodiment of an electronic device.

FIG. 2 is a block diagram of one embodiment of an electronic device 10. The electronic device 10 includes a headphone interface 20, a signal processing unit 100, a detection circuit 103, an internal microphone 104, a multiplexer 105, and an audio processing unit 106. The electronic device 10 is operable to switch the audio input channel based on different types of audio connectors connected with the electronic device.

The electronic device 10 is generally controlled and coordinated by an operating system, such as UNIX, Linux, Windows, Mac OS, an embedded operating, or any other compatible system. Alternatively, the electronic device 10 may be controlled by a proprietary operating system. Typical operating systems control and schedule computer processes for execution, perform memory management, provide file system, networking, and I/O services, and provide a user interface, such as a graphical user interface (GUI), among other tasks.

The headphone interface 20 is operable to connect with the audio connector of the headphone. The detection circuit 103 includes a headphone pin HD and a button pin PTT. The detection circuit 103 is operable to detect a level of a last pole of the audio connector, transfer the level of the last pole into a first level of the headphone pin HD and a second level of the button pin PTT, and output the first level and the second level to the signal processing unit 100. The last pole of the audio connector represents the third pole of the audio jack A, or the fourth pole of the audio jack B.

The first level of the headphone pin HD is a low level (HD=0) when no headphone is connected with the headphone interface 20. The first level of the headphone pin HD is a high level (HD=1) when the headphone is connected with the headphone interface 20. The second level of the button pin PTT is the high level (PTT=1) when the control button of the headphone having the microphone and the control button is pressed. The microphone of the headphone is disabled when the control button is pressed, such that the audio signal is merely inputted into the electronic device through the internal microphone 104. The second level of the button pin PTT is the low level (PTT=0) when the control button is released.

The signal processing unit 100 includes an acquisition module 101 and a control module 102. The acquisition module 101 is operable to receive the first level and the second level from the headphone pin HD and the button pin PTT of the detection circuit 103. The acquisition module 101 further determines whether the first level is the same as the second level and outputs the result to the control module 102. The control module 102 is operable to control the multiplexer 105 to switch the audio input channel of the electronic device in response to the first level and the second level.

The control module 102 is further operable to transmit a first command to the multiplexer 105 if the first level is the same as the second level, and transmit a second command to the multiplexer 105 if the first level is different from the second level.

The multiplexer 105 is further operable to set a first input of the internal microphone 104 as the audio input channel based on the first command, and set a second input of the headphone interface 20 as the audio input channel based on the second command.

The audio processing circuit 106 is operable to process the audio signal from the audio input channel. The audio processing circuit 106 electronically connects with internal microphone 104 through the multiplexer 105 when the first input is set as the audio input channel. The audio processing circuit 106 electronically connects with headphone interface 20 through the multiplexer 105 when the second input is set as the audio input channel.

Figure 3:
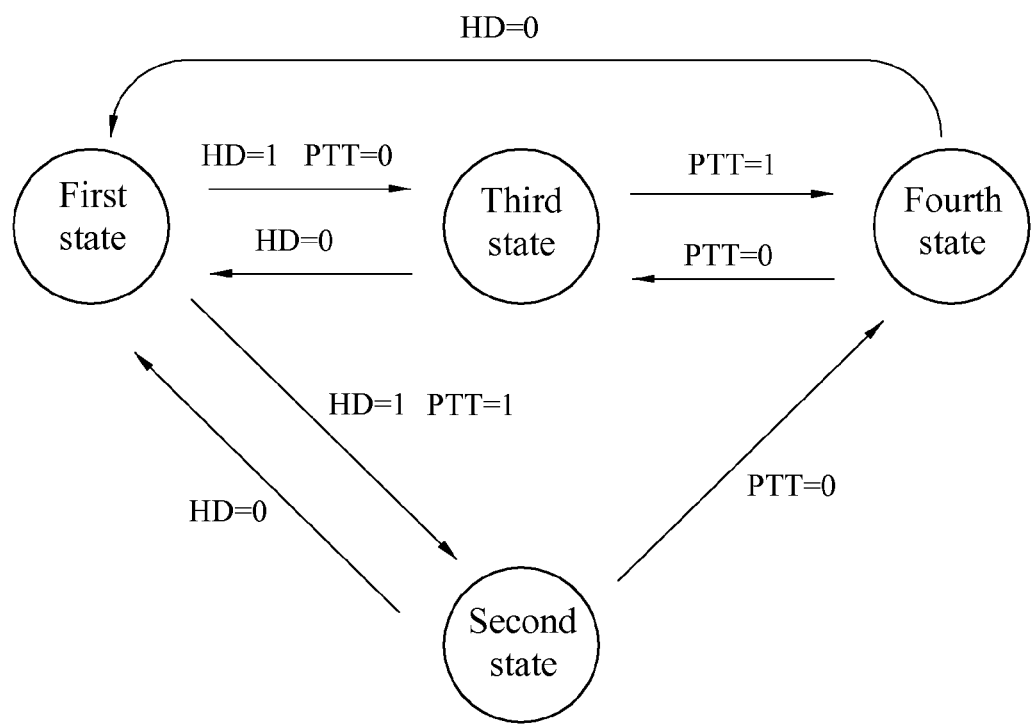
FIG. 3 is an exemplary diagram showing four operating states of the present disclosure.

FIG. 3 is a diagram showing four operating states of the present disclosure. A first state indicates that no headphone is connected with the headphone interface 20 (HD=0, PTT=0). A second state indicates that the headphone having no microphone is connected with the headphone interface 20 (HD=1, PTT=1). A third state indicates the headphone having the microphone is connected with the headphone interface 20 and the control button is released (HD=1, PTT=0). A fourth state indicates the headphone having the microphone is connected with the headphone interface 20 and then the control button is pressed (HD=1, PTT=1)

When the headphone having no microphone is connected with the headphone interface 20, the operating state is changed from the first state to the second state. When the headphone having the microphone is connected with the headphone interface 20 and the control button is released, the operating state changes from the first state to the third state. When the acquisition module 101 receives the second level as the high level (PTT=1) in the third state, the operating state is changed from the third state to the fourth state.

When the headphone having the microphone is connected with the headphone interface 20 and the control button is pressed in advance, the electronic device 10 determines the operating state is the second state. Once the control button is released, the electronic device 10 transfers the operating state from the second state to the fourth state.

Figure 4:
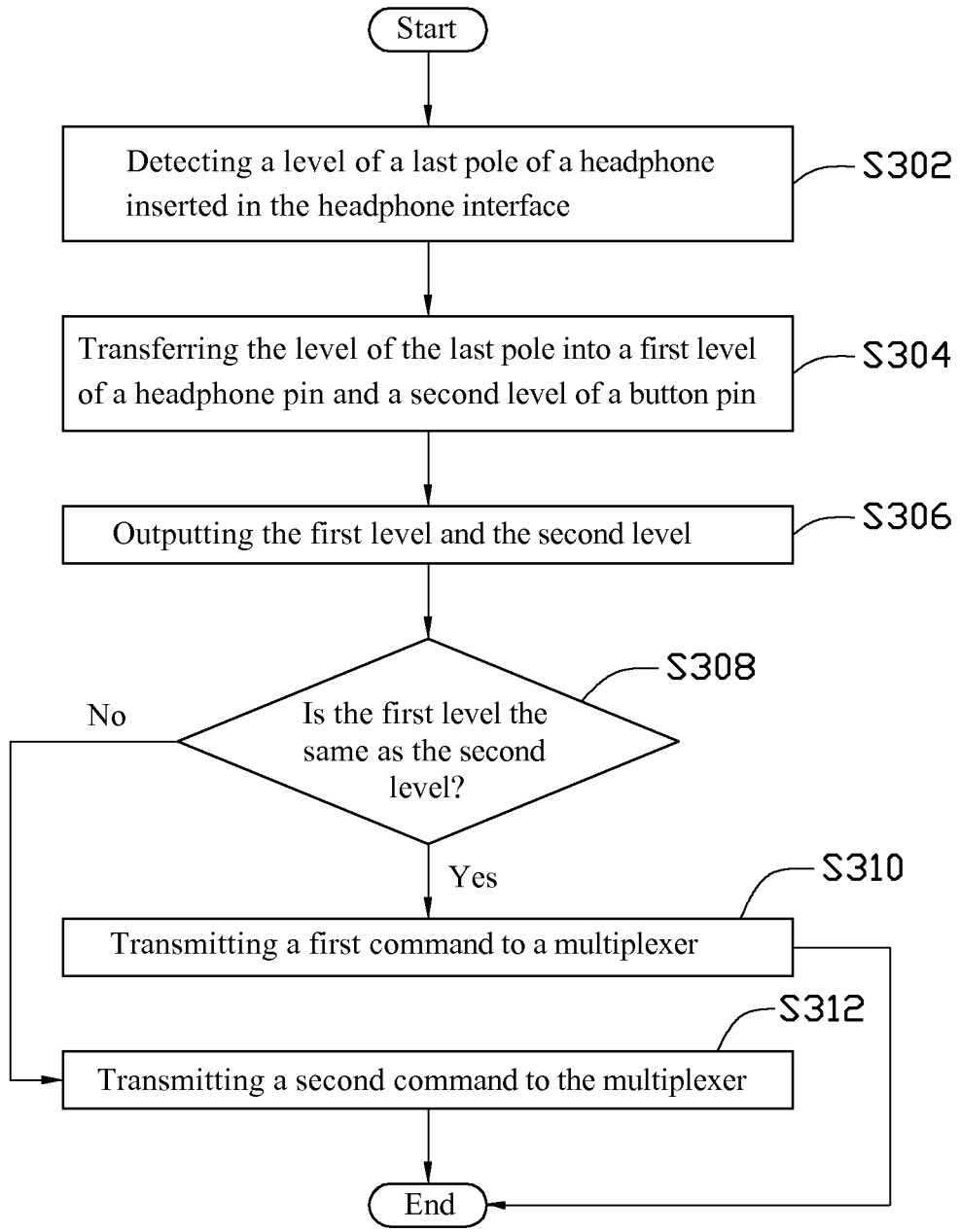
FIG. 4 is a flowchart illustrating one embodiment of a method for switching an audio input channel of an electronic device.

FIG. 4 is a flowchart illustrating one embodiment of a method for switching the audio input channel of the electronic device 10. Depending on the embodiment, additional blocks in the flow of FIG. 4 may be added, others removed, and the ordering of the blocks may be changed.

In block S302, the detection circuit 103 detects the level of the last pole of the headphone connecting with the headphone interface 20.

In block S304, the detection circuit 103 transfers the level of the last pole into the first level of the headphone pin HD and the second level of the button pin PTT.

In block S306, the detection circuit 103 outputs the first level and the second level to the acquisition module 101.

In block S308, the acquisition module 101 determines whether the first level is the same as the second level and outputs the result to the control module 102.

In block S310, if the first level is the same as the second level, the control module 102 transmits the first command to the multiplexer 105. The multiplexer 105 then sets the first input of the internal microphone 104 as the audio input channel based on the first command.

In block S312, if the first level is different from the second level, the control module 102 transmits the second command to the multiplexer 105. The multiplexer 105 then sets the second input of the headphone interface 20 as the audio input channel based on the second command.

The present disclosure provides a method for efficiently switching audio input channels of an electronic device when a headphone or headset is connected.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for switching an audio input channel of an electronic device, the electronic device comprising a signal processing unit, a headphone interface, and a detection circuit comprising a headphone pin and a button pin, the method comprising:
   detecting a level of a last pole of an audio connector of a headphone connected with the headphone interface;
   transferring the level of the last pole into a first level of the headphone pin and a second level of the button pin;
   outputting the first level and the second level into the signal processing unit;
   transmitting commands in response to the first level and the second level;
   switching the audio input channel based on the commands;
   transmitting a first command to the multiplexer if the first level is the same as the second level; and
   transmitting a second command to the multiplexer if the first level is different from the second level.

2. The method of claim 1, wherein the electronic device further comprises an internal microphone, the step of switching the audio input channel further comprises:
   setting a first input of the internal microphone as the audio input channel based on the first command; and
   setting a second input of the headphone as the audio input channel based on the second command.

3. The method of claim 2, wherein a state of the first level is the same as the second level further comprises:
   the first level and the second level are both low levels when no headphone is connected with the headphone interface;
   the first level and the second level are both high levels when the headphone having a microphone and a control button is connected with the headphone interface, wherein the control button is pressed; and
   the first level and the second level are both high levels when the headphone having no microphone is connected with the headphone interface.

4. The method of claim 3, wherein the first level is different from the second level further comprises:
   the first level is high level and the second level is low level when the headphone having the microphone and the control button is connected with the headphone interface, wherein the control button is released.

5. An electronic device, comprising:
   a headphone interface operable to connect with an audio connector of a headphone;
   a detection circuit comprising a headphone pin and a button pin, the detection circuit being operable to detect a level of a last pole of the audio connector, transfer the level of the last pole into a first level of the headphone pin and a second level of the button pin, and output the first level and the second level;
   a multiplexer operable to switch an audio input channel of the electronic device in response to the first level and the second level;
   a signal processing unit, the signal processing unit comprises:
   an acquisition module operable to receive the first level and the second level and determine whether the first level is the same as the second level; and a control module operable to control the multiplexer to switch the audio input channel of the electronic device in response to the first level and the second level, transmit a first command to the multiplexer if the first level is the same as the second level, and transmit a second command to the multiplexer if the first level is different from the second level.

6. The electronic device of claim 5, wherein the electronic device further comprises an internal microphone, the multiplexer is further operable to
- set a first input of the internal microphone as the audio input channel based on the first command; and
- set a second input of the headphone as the audio input channel based on the second command.

7. The electronic device of claim 6, wherein a state of the first level is the same as the second level further comprises:
- the first level and the second level are both low levels when no headphone is connected with the headphone interface;
- the first level and the second level are both high levels when the headphone having a microphone and a control button is connected with the headphone interface, wherein the control button is pressed; and
- the first level and the second level are both high levels when the headphone having no microphone is connected with the headphone interface.

8. The electronic device of claim 7, wherein the state of the first level is different from the second level further comprises:
- the first level is high level and the second level is low level when the headphone having the microphone and the control button is connected with the headphone interface, wherein the control button of the headphone is released.

9. A non-transitory storage medium having stored thereon instructions that, when executed by a processor, causing the processor to perform a method for switching an audio input channel of an electronic device, the electronic device comprising a signal processing unit, a headphone interface, and a detection circuit comprising a headphone pin and a button pin, the method comprises:
- detecting a level of a last pole of an audio connector of a headphone connected with the headphone interface;
- transferring the level of the last pole into a first level of the headphone pin and a second level of the button pin;
- outputting the first level and the second level into the signal processing unit;
- transmitting commands in response to the first level and the second level;
- switching the audio input channel based on the commands;
- transmitting a first command to the multiplexer if the first level is the same as the second level; and
- transmitting a second command to the multiplexer if the first level is different from the second level.

10. The non-transitory storage medium of claim 9, wherein the electronic device further comprises an internal microphone, the step of switching the audio input channel further comprises:
- set a first input of the internal microphone as the audio input channel based on the first command; and
- set a second input of the headphone as the audio input channel based on the second command.

11. The non-transitory storage medium of claim 10, wherein a state of the first level is the same as the second level further comprises:
- the first level and the second level are both low levels when no headphone is connected with the headphone interface;
- the first level and the second level are both high levels when the headphone having a microphone and a control button is connected with the headphone interface, wherein the control button is pressed; and
- the first level and the second level are both high levels when the headphone having no microphone is connected with the headphone interface.

12. The non-transitory storage medium of claim 11, wherein the first level is different from the second level further comprises:
- the first level is high level and the second level is low level when the headphone having the microphone and the control button is connected with the headphone interface, wherein the control button is released.

* * * * *